United States Patent [19]

Matsumoto et al.

[11] 4,302,692
[45] Nov. 24, 1981

[54] ROTATIONAL SPEED SIGNAL SENSOR

[75] Inventors: Hisayuki Matsumoto; Uneho Niimi, both of Hirakata; Shuichi Obata, Kyoto, all of Japan

[73] Assignee: Matsushita Electric Industrial Co., Ltd., Osaka, Japan

[21] Appl. No.: 41,823

[22] Filed: May 23, 1979

[30] Foreign Application Priority Data

| Feb. 6, 1978 | [JP] | Japan | 53-67035 |
| Feb. 6, 1978 | [JP] | Japan | 53-67036 |
| Feb. 6, 1978 | [JP] | Japan | 53-67037 |
| Feb. 6, 1978 | [JP] | Japan | 53-67039 |

[51] Int. Cl.³ ............................................. H02K 47/04
[52] U.S. Cl. ................... 310/113; 310/138; 310/156; 310/266
[58] Field of Search ............... 310/113, 138, 266, 156, 310/152

[56] References Cited

U.S. PATENT DOCUMENTS

| 2,912,609 | 11/1959 | Kassner | 310/156 |
| 3,230,434 | 1/1966 | Bauerlein | 310/156 X |
| 3,231,770 | 1/1966 | Hyde | 310/162 X |
| 3,355,645 | 11/1967 | Kawakami et al. | 310/156 X |
| 3,479,539 | 11/1969 | Brion | 310/156 X |
| 3,969,644 | 7/1976 | Nowak | 310/152 |
| 4,082,968 | 4/1978 | Jones | 310/113 X |
| 4,082,970 | 4/1978 | Girardin | 310/266 X |
| 4,237,394 | 12/1980 | Aoki | 310/266 X |

FOREIGN PATENT DOCUMENTS 971680 2/1959 Fed. Rep. of Germany ...... 310/266

Primary Examiner—Donovan F. Duggan
Attorney, Agent, or Firm—Burgess, Ryan and Wayne

[57] ABSTRACT

A rotational speed signal sensor for a motor having a rotating permanent magnet as a rotor. One cylindrical surface of a hollow cylindrical rotating magnet has a series of magnetic poles which coact with the stator windings so as to produce the torque while the other cylindrical surface of the rotating magnet has a series of magnetic poles which coact with a sensor coil so as to derive the rotational speed signal.

13 Claims, 19 Drawing Figures

ROTATIONAL SPEED SIGNAL SENSOR

BACKGROUND OF THE INVENTION

The present invention relates to a rotational speed signal sensor for an electric motor having a rotating permanent magnet as a rotor.

A typical prior art rotational speed signal sensor of the type described consists of a gear which is made of magnetic materials and mounted on the shaft of a DC motor, an exciting magnet and a magnetic sensor head mounted on the frame of the motor. Upon rotation of the motor, the magnetic gear causes the magnetic path between the sensor head and the magnet to vary so that the output signal of a frequency representative of the rotational speed of the DC motor may be derived from the output terminals of the sensor head. However the rotational speed signal sensor of the type described above is disadvantageous in that it is complex in construction and needs a large installation space because it is installed at the exterior of the motor and that the productivity is low because of a large number of components.

SUMMARY OF THE INVENTION

Accordingly, one of the objects of the present invention is to provide a rotational speed signal sensor wherein the rotating magnet or rotor of a DC motor may be utilized as one component of the rotational speed signal sensor so that no additional rotor and its associated transmission mechanism will be required.

Another object of the present invention is to provide a rotational speed signal sensor for a DC motor wherein one cylindrical surface of a hollow cylindrical rotating magnet is utilized to produce the rotating force while the other cylindrical surface is utilized to derive the rotational speed signal so that the dimensional variations may be minimized in the case of the mass production and consequently the rotational speed may be detected with a higher degree of accuracy.

The present invention comprises a hollow cylindrical rotating magnet whose one cylindrical surface has a first series of a number of n magnetic poles which are equiangularly spaced apart from each other in the circumferential direction and whose the other cylindrical surface has a second series of a number of m (where m>n) magnetic poles which are equiangularly spaced apart from each other in the circumferential direction, a stator having windings which are disposed in opposed relationship with said first magnetic pole series of the rotating magnet so as to coact it to produce the rotating force, a sensor coil having sensor winding elements which are located at angular positions corresponding to the magnetic poles of said second series of said rotating magnet and are electrically interconnected in a zig-zag form, and a supporting member for supporting said sensor coil in such a way that the sensor coil may be maintained in the form of a ring which is in opposed relationship with said second magnetic pole series of the rotating magnet and radially spaced apart therefrom by a predetermined distance, whereby said first magnetic pole series of the rotating magnet may coact with the stator windings so as to deliver the rotating force to the rotating magnet while said second magnetic pole series of the rotating magnet may coact with the sensor coil so as to derive the output signal representative of the rotational speed of the rotating magnet.

DESCRIPTION OF THE PREFERRED EMBODIMENTS

First Embodiment, FIGS. 1–5

Figure 1:
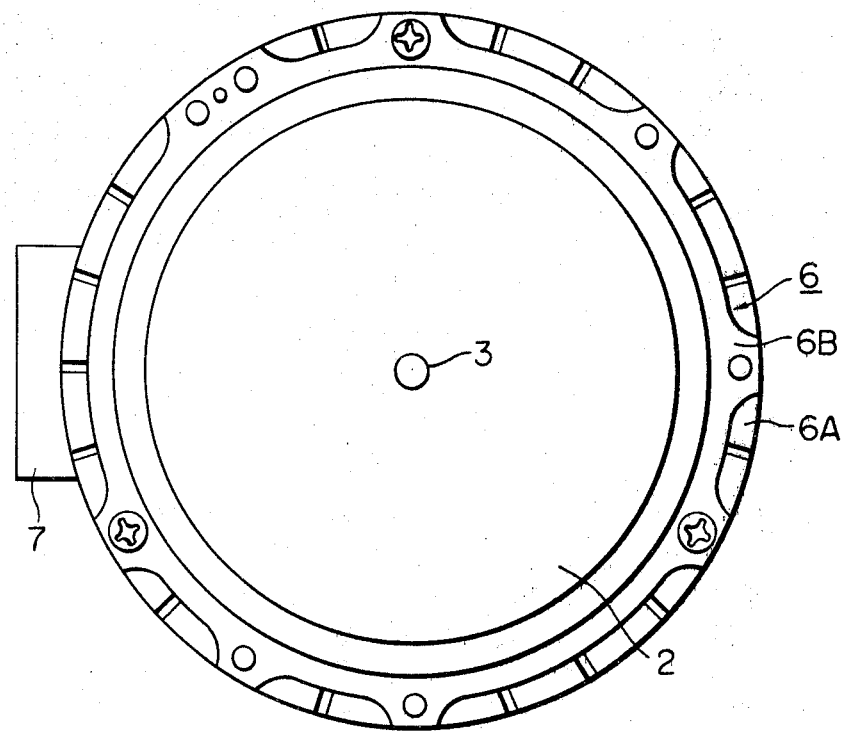
FIG. 1 is a top view of a first embodiment of a rotational speed signal sensor in accordance with the present invention.
Figure 2:
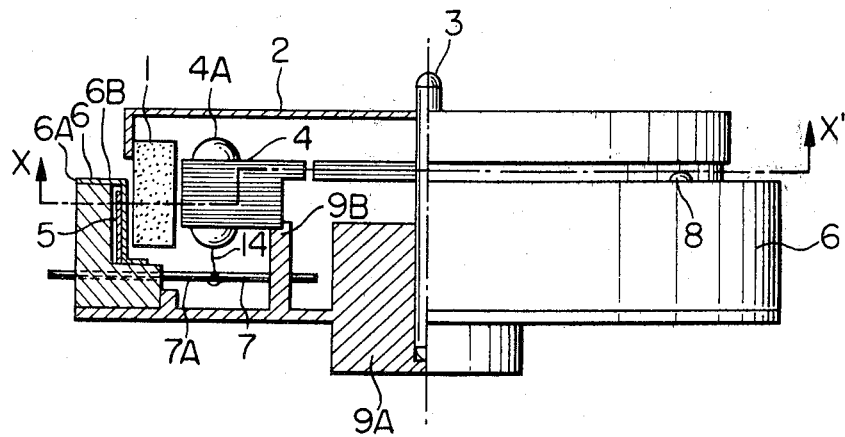
FIG. 2 is a front view, partly in section, thereof.
Figure 3:
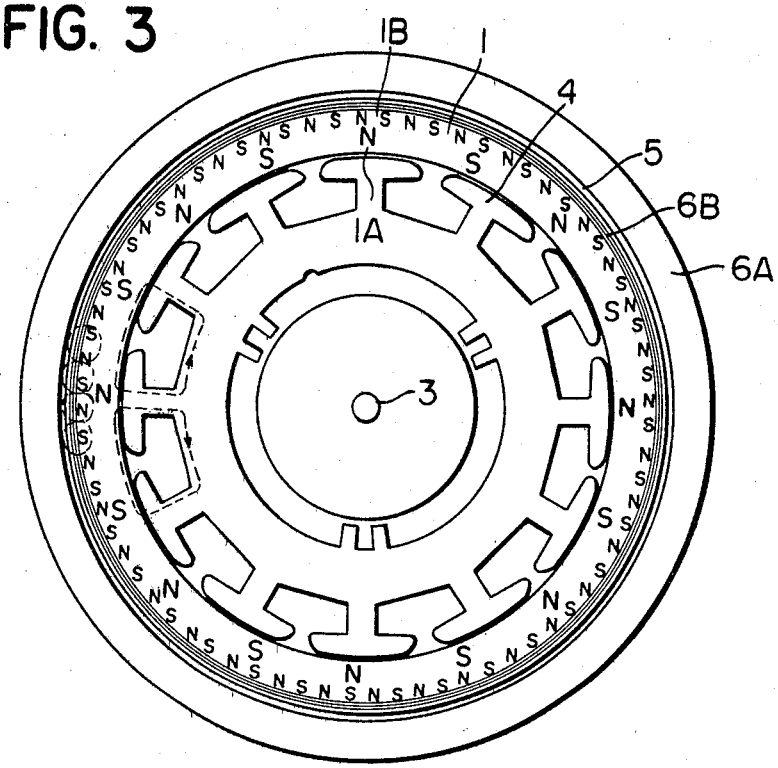
FIG. 3 is a sectional view taken along the line X—X' of FIG. 2.

Referring to FIGS. 1–5, a cylindrical rotor 1 which is made of isotropical magnetic materials has an inner peripheral surface which has a first pole group 1A consisting of a number of n equiangularly spaced poles; the outer peripheral surface having a second pole group 1B consisting of a number of m (m>n) equiangularly spaced apart poles. The rotor 1 is mounted on a disk 2 whose rotary shaft 3 is rotatably supported by a bearing 9A of a base member 9. A stator 4 is mounted on an annular mounting ring 9B of the base member 9 in opposed relationship with the first pole group 1A of the rotor 1. The stator 4 has windings 4A which are so energized as to cause the rotor 1 to rotate.

Figure 5:
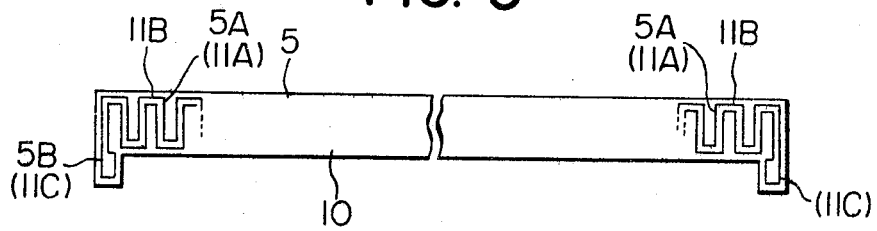
FIG. 5 is a top view of a sensor coil.

A ring-shaped sensor coil 5 is disposed coaxially of the rotor 1 and spaced apart therefrom by a predetermined distance. The sensor coil 5 has on its inner surface a number of m sensor winding elements 5A which are equiangularly spaced apart from each other in opposed relationship with the number of m poles of the second pole group B of the rotor 1. That is, as best shown in FIG. 5, the sensor coil 5 consists of a flexible, strip-like insulating sheet 10 upon which are printed or otherwise formed a number of m conductor foils or films 11A spaced apart from each other by a predetermined distance and interconnected in a zig-zag form by connection foils or films 11B. Terminal strips 11C or output terminals 5B are extended from both ends of the zig-zag foil path for external connections. The zig-zag path including its output terminals 5B may be formed by the etching or die-stamping techniques.

Figure 4:
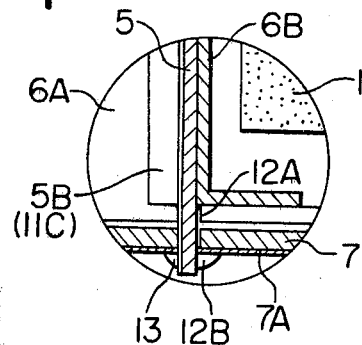
FIG. 4 is a fragmentary view, on enlarged scale, thereof.

The sensor coil 5 is supported by a sensor coil supporting member 6 consisting of an outer ring 6A and an inner ring 6B. The outer ring 6A is made of synthetic resins and mounted on the base 9 in coaxial relationship with the rotor 1. The sensor coil 5 is bonded to the outer surface of the inner ring 6B which in turn is mounted on and securely joined to the outer ring 6A with screws 8 in such a way that the sensor coil 5 may be radially spaced apart from the outer magnet pole group 1B of the rotor 1 by a predetermined distance. As best shown in FIG. 4, each of the output terminals 5B of the sensor coil 5 is extended through a hole 12A of the outer ring 6A and then a hole 12B of a printed-winding board 7 and is connected to a conduction foil 7A with solder 13. Each lead wire 14 of the stator winding 4A is soldered to the conduction foil 7A.

The magnetic flux which causes the rotating magnet 1 to rotate extends from the N pole of the rotor 1 through the air gap, the pole of the stator, the stator, the pole of the stator, the air gap, the S pole back to the N pole. In like manner, the magnetic flux which is needed to generate a rotational speed signal extends from the N pole of the rotating magnet 1 through the air gap, the supporting ring, the sensor coil, the supporting ring, the air gap to the S pole.

The rotational speed sensor with the above construction has the following advantages:

(i) No additional rotor is required for the detection of the rotational speed signal. That is, the magnetic fields produced by the number of m magnet poles on the outer surface of the rotating magnet 1 are used for generating the speed signal while the magnetic fields produced by the number of n magnet poles on the inner surface of the rotating magnet 1 are used for driving the same. The rotating magnet 1 is made of expensive materials, but is shared in common by the driving magnet pole group 1A and the signal generating magnet pole group 1B so that the rotational speed signal sensor may be made extremely simple in construction and fabricated at less costs.

(ii) In order to obtain rotational speed signal, the rotating magnet 1 is radially oriented; that is, the outer peripheral surface is magnetized. Therefore the sensor coil 5 may be disposed in the radial direction. In the case of the mass production of the speed signal sensors, the inner and outer peripheral surfaces are ground and polished to desired accuracy so that the whirling of the rotating magnet is eliminated to the minimum. As a result, the supporting member 6 and the sensor coil 5 may be located very close to the rotating magnet 1 so that the variations in signal detected may be considerably reduced in the mass production.

(iii) The sensor coil 5 and the rotating magnet 1 sandwich the inner ring 6B of the supporting member 6 so that the inner ring 6B may be made of non-magnetic materials. For instance, the thin inner ring 6B may be molded from synthetic resins or formed by drawing thin sheet metal. Especially copper and aluminum sheets are advantageous because they may be made extremely thin and so designed and constructed as to exhibit high mechanical strength and are very light in weight and inexpensive.

Even though the speed signal sensor of the present invention electromagnetically detects the rotational speed of the rotating magnet 1, the sensor coil 5 is shielded by the inner ring 6B of the supporting member. However the detection frequency ranges from a few to hundreds Hz. Advantages of copper and aluminum may be fully utilized so that the precision of the mechanism may be considerably improved. When the metal materials described above are used for the fabrication of the inner ring 6B of the supporting member 6, interference by relatively high frequencies (higher than a few KHz) which externally affect the sensor coil 5 may be avoided. That is, the metal material of the peripheral surfaces of the inner ring 6B causes eddy current losses for these relatively high frequencies so that the rotational speed signal sensor may become immune to the high frequency induction or electromagnetic interference essentially through the space.

(iv) The source of the magnetic flux of the detection signal exists at the outer peripheral side of the rotating magnet 1 so that the number m may be considerably increased as compared with the number n of the magnet poles of the magnetic flux which is needed for generating the rotating force. That is, in the first embodiment $n=16$ and $m=72$, but these numbers are given for the sake of easy understanding. The number m may be determined depending upon the outer diameter D of the rotating magnet 1, the minimum distance between the poles of a magnetizer and so on. Even in the case of a rotating magnet with an outer diameter from 90 to 100 mm, the number m may be selected between 200 and 500. As a result, the output frequency which is the rotational speed signal may be increased so that in the case of controlling the current flowing through the windings of the stator by utilizing said output signal, the ripple frequency of the current to be controlled may be also increased. Therefore the gain of a speed control feedback system may be increased. As a result the variations in rotational speed due to variations in load torque may be minimized. In addition, the rising characteristics at starting and the response characteristics of the speed control system in the case of the variations in external disturbance load may be considerably improved.

(v) When isotropic magnetic materials are used, the orientations in the magnetic materials themselves are different from those when molded so that the opposite poles in the interior of the magnet are lined with the shortest magnetic flux flow. As a result, the strong magnetic flux flow of n poles for driving (magnetized at the inner peripheral surface) only slightly affects the weak magnetic flux flow of m poles for the detection of the rotational speed (magnetized at the outer peripheral surface) so that the components due to the n magnet poles for generating said rotating force in the signal generated or induced in the sensor coil 5 are reduced and consequently the rotational speed may be detected with a considerably higher degree of accuracy. This means that it is possible to control the rotational speed with an extremely higher degree of accuracy.

In the first embodiment, the inner ring 6B of the supporting member 6 has been described as being constructed of metal materials, but it is to be understood that it may be molded from synthetic resins. Instead of bonding the sensor coil 5 to the outer peripheral surface of the inner ring 6B, it may be interposed between the inner and outer rings 6B and 6A of the supporting member. Instead of supporting the sensor coil 5 by the double-construction supporting member 6 consisting of the inner and outer rings 6B and 6A, the sensor coil 5 may be supported by being merely bonded to the inner peripheral surface of the outer ring 6A.

In summary, the peripheral surface of the rotating magnet is magnetized so as to utilize the magnetization in the detection of the rotational speed signal. As a result, the rotational speed sensor may be provided which is simple in construction, inexpensive to fabricate yet highly reliable and dependable in operation. In addition, the parts of the rotational speed signal sensor may be fabricated with a higher degree of dimensional accuracies in simple manner; the variations in output signal may be minimized; the construction is such that the rotational speed signal sensor may be immune to the high frequency induction and electromagnetic interference; and the output frequency per revolution may be considerably increased. The present invention may be applied to the rotational speed signal sensor of the type described so as to obtain remarkable effects.

SECOND EMBODIMENT, FIGS. 6–8

Figure 6:
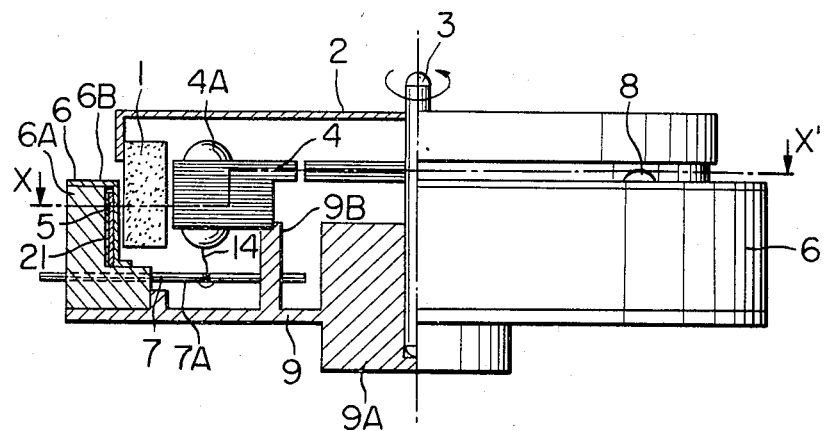
FIG. 6 is a front view, partly in section, of a second embodiment of the present invention.
Figure 7:
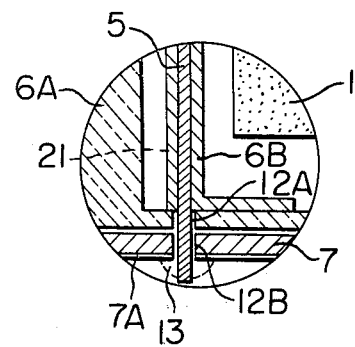
FIG. 7 is a fragmentary view, on enlarged scale, thereof.
Figure 8:
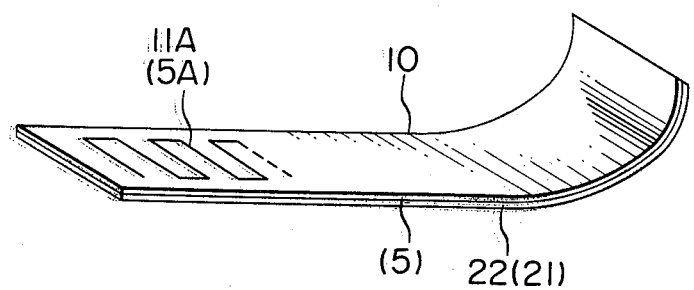
FIG. 8 is a perspective view of a sensor coil thereof.

The second embodiment shown in FIGS. 6–8 is substantially similar in construction to the first embodiment described above with reference to FIGS. 1–5 except that, as best shown in FIG. 8, the sensor coil 5 is lined with a ringshaped magnetic member 21. The sensor coil 5 is fabricated in the manner described elsewhere. The magnetic lining member 21 consists of an insulating sheet 22 whose one surface is coated with magnetic materials, and the other surface of the insulating sheet or strip 22 which is not coated is bonded to the surface of the sensor coil member 5 bearing the conduction path 11A.

The unitary assembly consisting of the sensor coil member 5 and the magnetic lining member 21 is bonded to the outer peripheral surface of the inner ring 6B of the supporting member 6 as with the first embodiment in such a way that the conduction path 11A is in opposed relationship with the outer magnet pole group 1B of the rotating magnet while the coated surface of the magnetic lining member 21 may be oriented radially outwardly.

In addition to the advantages (i)–(v) described above, the second embodiment with the above construction has a further advantage to be described below.

(vi) Since the sensor coil 5 is surrounded with the magnetic member, the magnetic flux which the rotating magnet 1 gives to the sensor coil 5 is increased so that the output signal induced across the sensor coil 5 is increased in strength. The additional effect of the magnetic lining member 21 is such that the thinner the flexible sheet 10 which constitutes the sensor coil 5, the stronger the output signal induced across the sensor coil 5 becomes.

Figure 9:
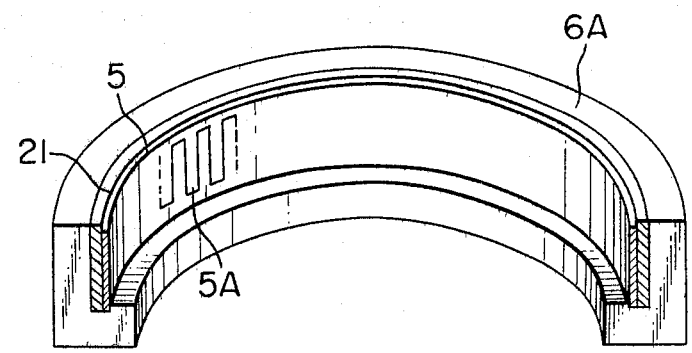
FIG. 9 is a perspective view, partly cut out, thereof illustrating a first modification of the mounting of the sensor coil and a magnetic member on a supporting member.
Figure 10:
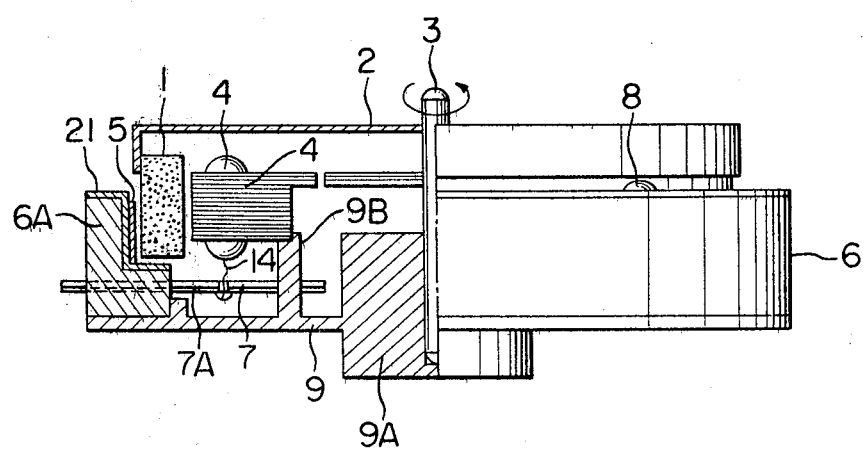
FIG. 10 is a front view, partly in section, thereof illustrating a second modification of the mounting of the sensor coil and magnetic member on the supporting member.
Figure 11:
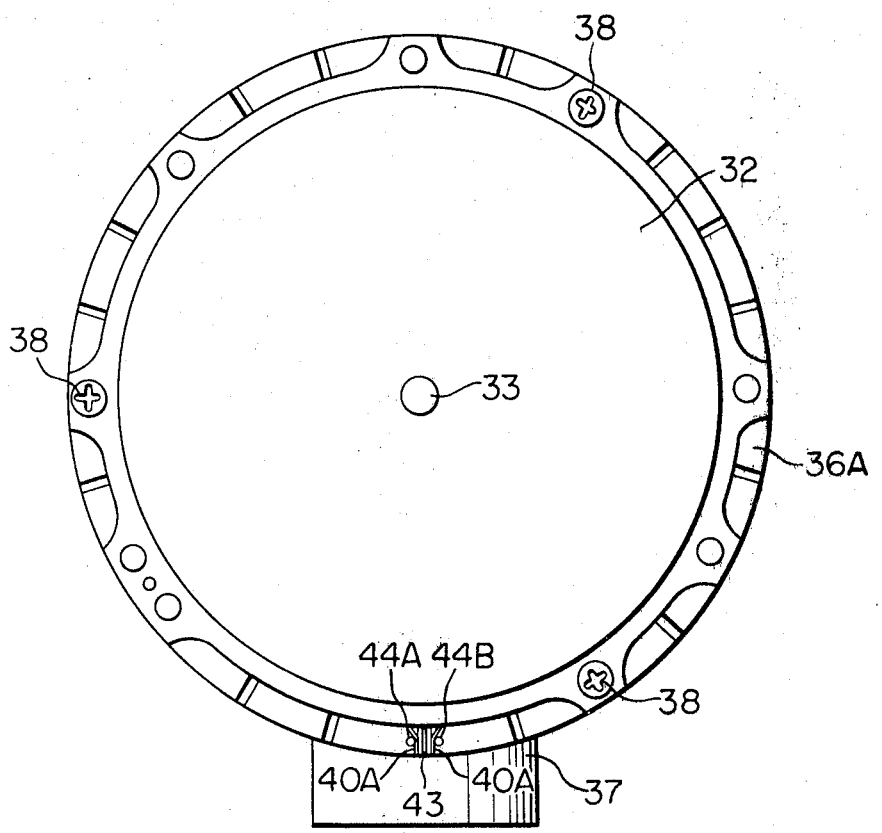
FIG. 11 is a top view of a third embodiment of the present invention.
Figure 12:
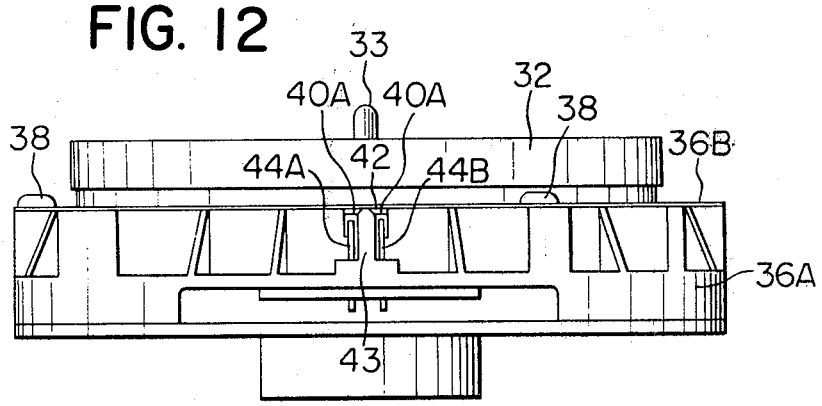
FIG. 12 is a front view thereof.
Figure 13:
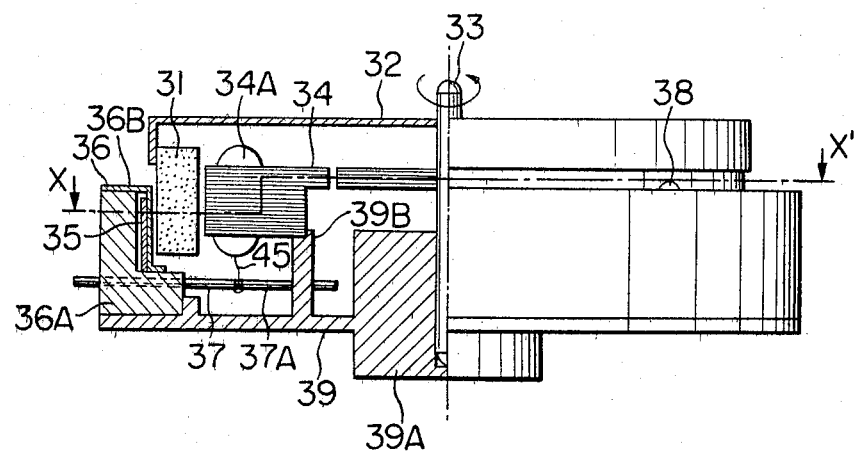
FIG. 13 is a side view, partly in section, thereof.
Figure 14:
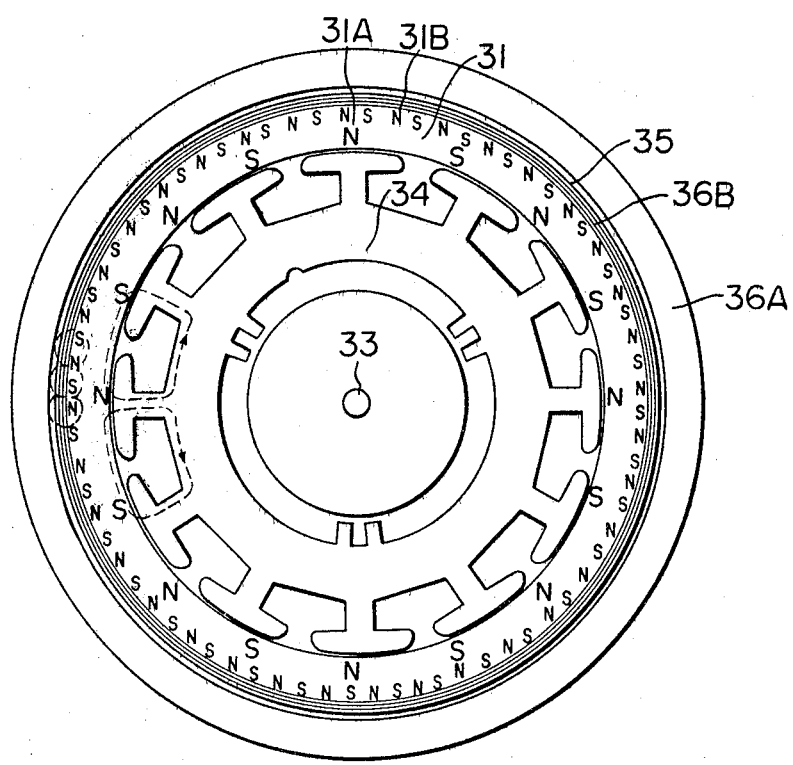
FIG. 14 is a sectional view taken along the line X—X' of FIG. 13.

In the second embodiment, the sensor coil 5 and the magnetic lining member 21 consist of the flexible sheets 10 and 21 which are made into a unitary assembly which is bonded to the outer peripheral surface of the inner ring 6 of the supporting member 6 in the form of a ring. However as shown in FIG. 9 both the sensor coil 5 and the magnetic lining member 21 are formed on a single flexible sheet, and the flexible sheet may be bonded to the inner peripheral surface of the outer ring 6A of the supporting member 6. Furthermore as shown in FIG. 10 the magnetic lining member 21 may be fabricated by drawing steel sheet or by molding of ferrites into the form of a ring. The ring is bonded to the outer ring 6A of the supporting member 6 and the sensor coil 5 is bonded to the inner peripheral surface of the magnetic ring. In this case, the inner ring 6B of the supporting member 6 may be provided if the protection of the sensor coil 5 is needed. Furthermore the unitary assembly of the magnetic member 21 and the sensor coil 5 may be interposed between the inner and outer rings 6B and 6A which constitute the supporting member 6.

In summary, when the peripheral surface of the rotating magnet is magnetized and the group of magnetic poles is utilized in the detection of the rotational speed signal, there may be provided a rotational speed sensor which is simple in construction and may be fabricated at less costs. The parts of the rotational speed sensor may be fabricated with a higher degree of dimensional accuracies. Furthermore the variations in output signal may be minimized. The rotational speed sensor may be made immune to high frequency induction and to electromagnetic interference. Moreover the output frequency per revolution may be considerably increased. Since the sensor coil is surrounded by the magnetic material, the strong output signal may be derived from the sensor coil. When the present invention is applied to the rotational speed signal sensor of the type described, remarkable effects may be attained.

Third Embodiment, FIGS. 11–16

Figure 15:
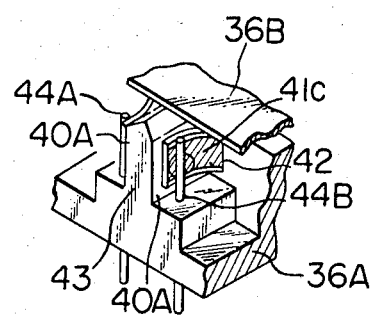
FIG. 15 is a fragmentary perspective view, on enlarged scale, of the third embodiment.
Figure 16:
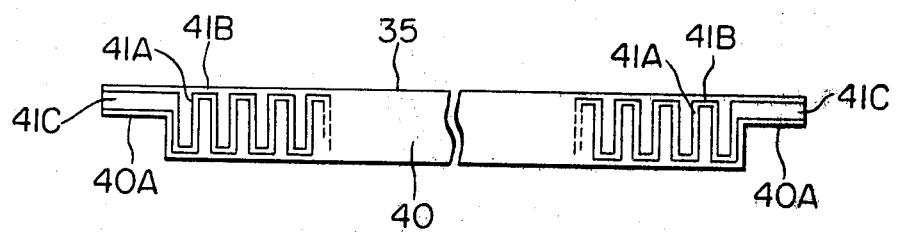
FIG. 16 is a top view of a sensor coil thereof.

In FIGS. 11–16 is shown the third embodiment of the present invention. In the figures 31 designates a cylindrical rotating magnet made of isotropic magnetic materials. The inner surface is magnetized so as to provide a magnetic pole group 31A consisting of n poles while the outer surface is so magnetized as to provide a magnetic pole group 31B consisting of m poles ($m > n$). 32 is a magnet carrier on which is mounted the rotating magnet 31; 33 is a rotary shaft of the magnet carrier 32 which is rotatably supported by a bearing 39A of a base member 39 so that the rotating magnet 31 is rotatably supported by the rotary shaft 33. 34 is a stator securely attached to a stator mounting member 39B of the base member 39 in opposed relationship with the number of n magnetic poles of the rotating magnet 31. The stator 34 has windings 34A which act on the number of n magnetic poles 31A of the rotating magnet 31 so as to impart the rotational force to the magnet 31. 35 is a ring-shaped sensor coil disposed in opposed relationship with the number of m magnetic poles 31B of the rotating magnet 31 and spaced apart therefrom by a predetermined distance. The sensor coil 35 has sensor windings which are disposed at angular positions corresponding to the pitch of the number of n magnetic poles. As shown in FIG. 16 the ring-shaped sensor coil 35 is fabricated by placing conductor layers 41A as sensing windings upon a strip of flexible insulating sheet 40 and interconnecting the conduction layers 41A with connection conductor layers 41B in zig-zag form and extending conductor layers 41C as output terminals from the ends of the zig-zag conductor path. The conductor layers 41A, 41B and 41C may be formed by the etching or die-stamping techniques. 36 is a sensor coil supporting member for supporting the sensor coil 35 in such a way that the sensor coil 35 may be spaced apart from the number of m magnetic poles 31B of the rotating magnet 31 by a predetermined distance. The supporting member 36 comprises an outer ring 36A which is made of synthetic resins and is securely disposed in coaxial relationship with the axis of rotation of the base member 39 and an inner ring 36B which is made of aluminum and securely attached to the outer ring 36A with screws 38 in coaxial relationship with the axis of rotation. The sensor coil 35 is bonded to the outer peripheral surface of the inner ring 36B which constitutes said supporting member 36, maintained in the form of a ring and spaced apart by a predetermined distance from the number of m magnetic poles 31B of the rotating magnet 31 in such a way that the conduction layers 41A, which serve as the sensing windings, may be securely held in angular positions corresponding to the pitch of the number of m magnetic poles. As shown in FIG. 15 the output terminals or tongues 40A of the sensor coil 35 are extended radially outwardly through the slits 42 of the outer ring 36A along the side walls of the projection 43 of the outer ring 36A and are soldered to connection pins 44A and 44B extended from the outer ring 36A in the vicinity of the projection 43. 37 is a printed winding board securely mounted on the base member 39. The conductor layers 37A on the undersurface of the printed winding board 37 are soldered to the lead wires 45 of the stator windings 34A and to the connection pins 44A and 44B to which are connected the sensor coil 35.

The direction of the magnetic flux which is required for generating the rotating force of the rotating magnet 31 is oriented from the magnetic pole N of the inner magnetic pole group 31A consisting of n poles, through the air gap, the projection of the stator, the stator, the projection of the stator, the air gap and the S pole back to the N pole. In like manner, the direction of the magnetic flux required for generating the rotational speed signal is oriented from the N pole of the outer magnetic pole group 31B of the rotating magnet 31 through the air gap, the supporting ring, the sensor coil, the supporting ring, the air gap and the S pole back to the N pole.

The rotational speed signal sensor with the above construction has the following advantages.

(i) No rotor is required for detecting the rotational speed. That is, the magnetic flux of the inner magnetic pole group of the rotating magnet 31 is utilized to produce the rotating force while the flux of the inner magnetic pole group is utilized to produce the speed signal. Therefore the inner and outer magnetic pole groups 31A and 31B may share in common a permanent magnet which is very expensive. As a result the rotational speed signal sensor may be made simple in construction and fabricated at less costs.

(ii) In order to detect the rotational speed signal, the rotating magnet 31 is radially magnetized (at the outer surface in the third embodiment) so that the sensor coil 35 may be radially disposed. As a consequence in the mass production of the rotational speed signal sensors, the inner and outer surfaces of the rotating magnet 31 may be ground and polished to a desired degree of accuracy so that the deflections of the inner and outer peripheral surfaces may be minimized. Consequently, the supporting member 36 and the sensor coil 36 may be disposed closer to the rotating magnet 31 so that in the case of the mass production the variations in detected signal may be minimized.

(iii) The sensor coil 35 is such that the inner ring 36B of the supporting member 36 is in opposed relationship with the peripheral surface of the rotating magnet 31 and sandwiches. Therefore the inner ring 36B of the supporting member 36 may be made of nonmagnetic materials. In general, it may be fabricated by molding synthetic resins into a thin sheet or by drawing thin sheet metal. Especially copper and aluminum sheets are advantageous in that they may be made extremely thin, formed into structures with high mechanical strength and is light in weight and inexpensive. Even though the rotational speed signal sensor acts electromagnetically, the coil sensor 35 is shielded by the inner ring 36B of the supporting member 36 when the electrical signal is derived. However the required frequency is from a few to hundreds Hz so that metal materials such as copper, aluminum and so on may be fully utilized as the material for the inner ring 36B of the supporting member 36 and the mechanical precision may be considerably improved. When the metal materials of the types described above are used as the material for the inner ring 36B of the supporting member 36, it becomes possible to avoid the interference to the sensor coil 35 due to the external, relatively high frequencies (higher than a few KHz). That is, the metal material on the peripheral surface of the inner ring 6B causes the eddy current losses to these relatively high frequencies so that the rotational speed signal sensor may be made immune to the high frequency induction and electromagnetic interference essentially through the space.

(iv) The flux source of the detected signal exists at the outer periphery of the rotating magnet 31 so that the number m may be remarkably increased as compared with the number n of the magnetic poles which are the magnetic flux source required for generating the rotating force. More particularly, in the third embodiment $n=16$ and $m=72$ but they are so illustrated for the sake of facilitating the understanding of the present invention. The value of m is dependent upon the outer diameter D of the rotating magnet 31 and the minimum pole distance of the magnetizer. Even a rotating magnet with the outer diameter of from 90 to 100 mm may have $m \approx 200-500$. As a result, the output frequency which represents the rotational speed signal may be increased. Therefore in the case of controlling the current flowing through the windings of the stator in response to the output signal, the ripple frequency of the current to be controlled may be also increased so that the gain of a speed control feedback system may be increased; the variations in rotational speed due to the variations in load torque may be minimized; and the rising characteristics at starting as well as the response characteristics of a speed control system to the variations in external disturbance load.

(v) Since the sensor coil 35 is surrounded with the magnetic member the magnetic flux which the rotating magnet 1 gives to the sensor coil 35 is increased so that the output signal induced across the sensor coil 35 may be increased in strength. The additional effect of the magnetic member is such that the thinner the flexible sheet which constitutes the sensor coil 35, the stronger the output signal induced across it becomes.

Figure 17:
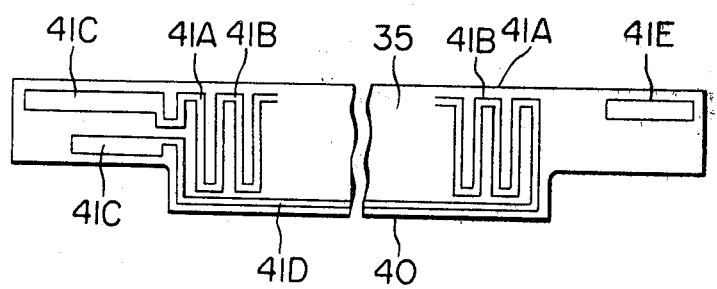
FIG. 17 is a top view of a first modification of the sensor coil.

In the third embodiment the connection pins 44A and 44B securely maintain the ends of the sensor coil 35 in such a way that the sensor coil 35 may be made into very close contact with the outer peripheral surface of the inner ring 36. However when a noise cancellation conductor layer 41D is provided as shown in FIG. 17, the output terminals 41C may be soldered to the connection pins 44A and 44B which are extended from one side wall of the projection 43 while a retaining conductor layer 41E may be soldered to a pin extended from the other side wall of the projection 43.

In summary, the periphery of the rotating magnet is so magnetized as to detect the rotational speed. Therefore the rotational speed sensor may be made simple in construction and fabricated at less costs. The parts of the rotational speed sensor may be fabricated at a higher degree of dimensional accuracies. The variations in output signal may be minimized. The rotational speed sensor may be made immune to the high frequency induction and electromagnetic interference. The output frequency per revolution may be increased. In addition the sensor coil supporting member consists of the outer and inner rings which are made of nonmagnetic materials, and the sensor coil is wrapped around the outer peripheral surface of the inner ring. The ends of the sensor coil are extended outwardly through the slits of the outer ring of the supporting member, maintained in opposed relationship with the side walls of the projection extended from the outer ring in the vicinity of the slits and connected to the pins extended from the projection. As a consequence the sensor coil may be mounted on the inner ring in a reliable and dependable manner. In addition, the connection may be much facilitated because of the projection.

Figure 18:
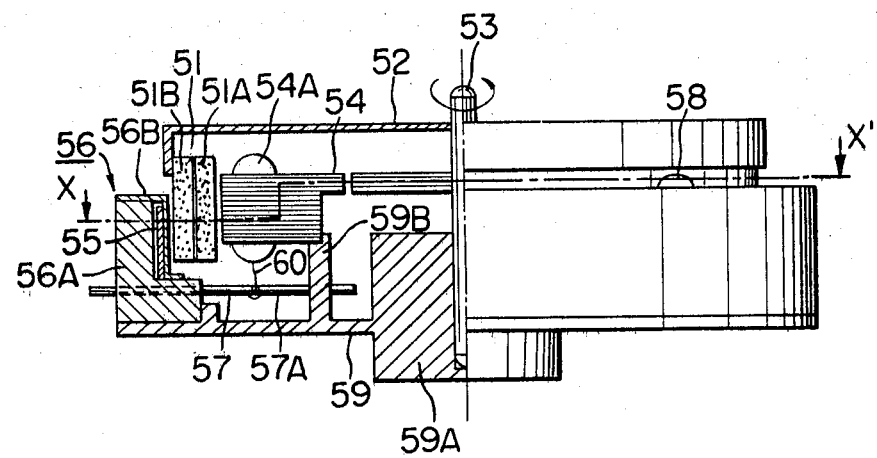
FIG. 18 is a front view, partly in section, of a fourth embodiment of the present invention.
Figure 19:
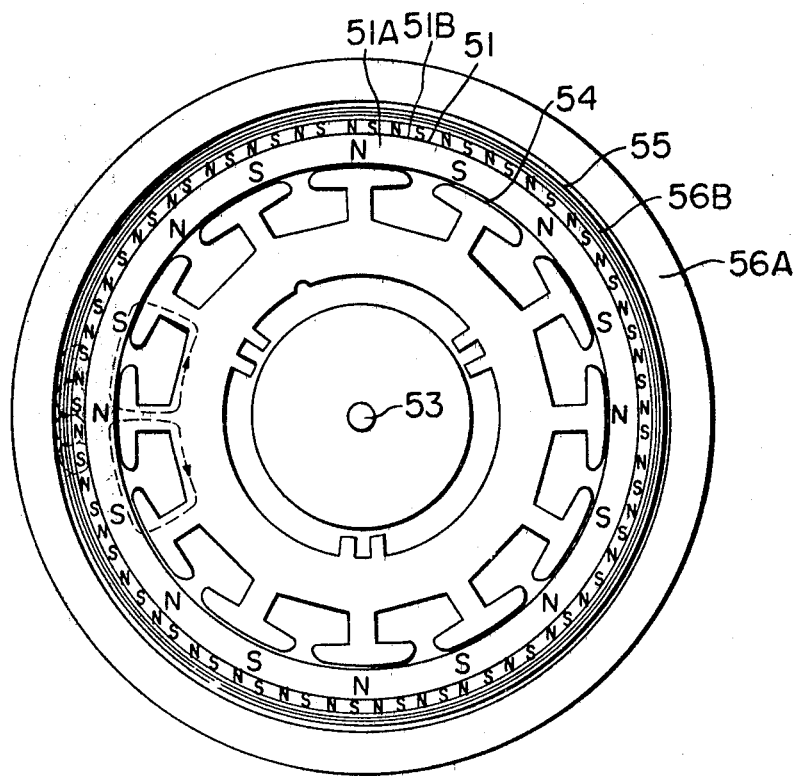
FIG. 19 is a sectional view taken along the line X—X' of FIG. 19.

Fourth Embodiment, FIGS. 18 and 19

The fourth embodiment of the present invention is shown in FIGS. 18 and 19. In the figures reference numeral 51 designates a cylindrical rotating magnet consisting of two magnets made of anisotropic magnetic materials. The inner surface of a first rotating magnet 51A has a number of n magnetic poles while a second rotating magnet 51B has at its outer peripheral surface a number of m magnetic poles (m>n). Said rotating magnet 51 is such that the first and second rotating magnets 51A and 51B are assembled coaxially with each other. If required, a ring-shaped sheild plate may be interposed between the first and second rotating magnets 51A and 51B. 52 is a magnet carrier upon which is mounted the rotating magnet 51. 53 is a rotary shaft to which is securely attached the rotating magnet carrier 52 and which is rotatably supported by a bearing 59A of a base member 59, whereby the rotating magnet 51 is rotatably supported by the rotary shaft 53. 54 is a stator mounted on a stator mounting member 59B of the base member 59 in opposed relation with the inner magnet poles the number of which is n. The stator 54 has windings 54A which act on the inner magnetic poles the number of which is n so as to impart the rotating force to the rotating magnet 51A. 55 is a sensor coil disposed in opposed relationship with the outer magnetic poles the number of which is m and spaced apart therefrom by a predetermined distance. The sensor coil 55 has sensing windings 55A which are disposed at angular positions corresponding to the pitch of the outer magnetic poles the number of which is m. In this embodiment the sensor coil 55 consists of a strip of flexible insulating sheet upon which are formed a zig-zag conductor layer 5A by the etching or die-stamping techniques. 56 is a supporting member which holds the sensor coil in a predeterminedly spaced apart relationship with the outer magnetic poles, the number of which is m, of the rotating magnet 51. The supporting member 56 consists of an outer ring 56A which is made of synthetic resins and mounted on the base member 59 coaxially of the axis of rotation and an inner ring 56B which is made of aluminum and is attached to the outer ring 56A with screws 58. The sensor coil 55 is bonded to the outer peripheral surface of the inner ring 56 which constitutes the supporting member 56 and is maintained in the form of a ring. The sensor coil 55 is so disposed and spaced apart by a predetermined distance from the outer magnetic poles of the rotating magnet 51 the number of which is m that the conductor layers 55A which are sensing windings may be securely held in the angular positions corresponding to the pitch of the outer magnetic poles, the number of which is m, of the rotating magnet 51. 57 is a printed winding board mounted on the base member 59. As shown in FIG. 18 the lead wires of the stator windings 54A and the output terminals of the sensor coil 55 are soldered to the winding pattern on the underside of the board 57.

The direction of the flux required for generating the rotating force of the rotating magnet 51 is oriented from the N pole of the inner magnetic poles the number of which is n through the air gap, the projection of the stator, the projection of the stator, the air gap and the S pole back to the N pole. In like manner magnetic flux required for generating the rotational speed signal of the rotating magnet 51B is oriented from the N pole of the outer magnetic poles the number of which is m through the air gap, the supporting ring, the sensor coil, the supporting ring, the air gap and the S pole.

The rotational speed signal sensor with the above construction has the following advantages:

(i) In order to detect the rotational speed signal, the rotating magnet 51 is radially magnetized (at the outer peripheral surface in the fourth embodiment) so that the sensor coil 55 may be radially disposed for detection. Therefore in the case of the mass production the inner and outer surfaces of the first and second rotating magnets 51A and 51B are ground and polished to predetermined accuracies so that the deflections of the inner and outer peripheral surfaces may be minimized. As a result the supporting member 56 and the sensor coil 55 may be disposed very closely to the rotating magnet 51 so that in the case of the mass production the variations in detected signal may be minimized.

(ii) The sensor coil 55 is such that the inner ring 56B which constitutes the supporting member 56 may be disposed in opposed relationship with the peripheral surface of the rotating magnet and sandwich. Therefore the inner ring 56B which constitutes the supporting member 56 may be made of nonmagnetic materials. In general synthetic resins which are molded into a thin form may be used. Alternatively, the products obtained by drawing thin sheet metal may be used. Especially copper and aluminum sheets are advantageous in that they may be made thin in thickness, may be constructed into structures with high mechanical strength and is light in weight and inexpensive. Even though the rotational speed signal sensor operates electromagnetically the sensor coil 55 is shielded by the inner ring 56B of the supporting member when the electrical output is derived. However the required frequency is from a few to hundreds Hz so that the metal materials such as copper, aluminum and so on may be fully utilized so as to attain high mechanical accuracies. When the metal materials of the types described are used as the materials for the inner ring 56B of the supporting member, it is possible to the interference due to relatively high frequencies (higher than a few kilo hertz) which are mixed from the exterior. That is, the metal material on the peripheral surface of the inner ring causes eddy current losses to the relatively high frequencies so that the rotational speed signal sensor may be made immune to the high frequency induction and electromagnetic interference essentially through the space.

(iii) The magnetic flux source for the detected signal exists at the outer periphery of the rotating magnet 51 so that the number m may be considerably increased as compared with the number n of magnetic poles which are the magnetic flux source for generating the rotating force. In the fourth embodiment n=16 and m=72, but they are merely so illustrated in order to facilitate the understanding of the underlying principle of the present invention. The value of m is dependent upon the outer diameter D of the second rotating magnet 51B and the minimum pole width or spacing of the magnetizer. Even a rotating magnet with the outer diameter of from 90 to 100 mm may have m≈200 to 500. As a result the output frequency which is the rotational speed signal may be increased so that in the case of controlling the current flowing through the stator windings in response to the output signal, the ripple frequency of the current to be controlled may be also increased. Consequently the gain of a speed control feedback system may be increased so that the variations in rotational speed in response to the variations in load torque may be minimized. In addition the rising characteristics at starting and the response characteristics of a speed control system to the external disturbance load variations may be remarkably improved.

(iv) As compared with the isotropic magnetic materials, the anisotropic magnetic materials have higher energy products so that the rotating torque may be increased as compared with the isotropic magnetic materials having the same volume. However when the magnet is oriented radially, the flow of the magnetic flux from the inner magnetic pole group consisting of the number of n poles extends to the outer peripheral surface. Therefore when the number of m magnetic poles are provided at the outer periphery of the magnet in order to detect the rotational speed signal, the sensor coil 55 detects the components of the inner magnetic poles or their harmonic components simultaneously so that is becomes difficult to control the rotational speed at a higher degree of accuracy. However when the rotating magnet 51 which is made of anisotropic magnetic materials is divided into the first and second rotating magnets 51A and 51B and a ring-shaped shielding plate is interposed between them if so required, the mutual interference between the first and second rotating magnets 51A and 51B may be minimized. As a consequence only the advantages of the anisotropic magnetic materials may be utilized.

When the sensor coil 55 is surrounded by a magnetic ring, the latter facilitates the establishment of the magnetic circuit for the outer magnetic poles of the second rotating magnet 51B so that the output signal induced across the sensor coil 55 may be increased in strength. In this case, the thinner the flexible sheet of the sensor coil 55, the stronger the output signal becomes. Instead of the magnetic ring, the outer ring 56A of the supporting member 56 may be so designed and constructed as to serve as a magnetic ring. That is, the outer ring 56A may be made of sheet steel, soft ferrite or sintered alloys of iron.

In summary, in the fourth embodiment the rotating magnet comprises two rotating magnets which are made of anisotropic magnetic materials and assembled coaxially. One rotating magnet is used for generating the torque while the other is used for detecting the rotational speed signal. Therefore even with the anisotropic magnetic materials, a series of stable magnetic poles may be provided for detecting the rotational speed. As a result the parts of the rotational speed sensor may be fabricated with a higher degree of dimensional accuracies. Variations in output signal may be minimized. The output frequency per revolution may be increased.

What is claimed is:

1. A rotational speed signal sensor, comprising:
   (a) an annular rotating magnet whose one cylindrical surface has a first series of a number of n magnetic poles equiangularly spaced apart in the circumferential direction and whose other cylindrical surface has a second series of a number of m magnetic poles equiangularly spaced apart from each other in the circumferential direction, where m>n,
   (b) a stator having stator windings which are securely held in position in opposed relationship with said first magnetic pole series of said rotating magnet so as to deliver a rotating force thereto,
   (c) a sensor coil having sensing windings which are located at angular positions corresponding to the pitch of said second magnetic pole series and which are interconnected in a zig-zag form, and
   (d) a supporting member for supporting said sensor coil in the form of a ring in such a way that said sensor coil may be in opposed relationship with said second magnetic pole series of said rotating magnet and radially spaced apart by a predetermined distance therefrom, whereby said first magnet pole series may coact with said stator so as to generate the rotating force while said second magnetic pole series may coact with said sensor coil, which is maintained in the form of a ring, so as to derive the rotational speed signal.

2. A rotational speed signal sensor as defined in claim 1 further characterized in that
said sensor coil consists of a flexible insulating sheet, a pluralty of conductor layers formed on said flexible insulating sheet and spaced apart from each other by a predetermined distance in the longitudinal direction of said flexible insulating sheet, and
a plurality of interconnection conductor layers formed on said flexible insulating sheet so as to interconnect said conductor layers in a zig-zag form.

3. A rotational speed signal sensor as defined in claim 2 further characterized in that
said supporting member consists of an outer ring made of nonmagnetic materials and an inner ring made of nonmagnetic metallic materials, and
said sensor coil is attached to the outer peripheral surface of said inner ring of said supporting member.

4. A rotational speed signal sensor as defined in claim 2 further characterized in that
said supporting member consists of an outer ring made of nonmagnetic materials and an inner ring made of nonmagnetic materials, and
said sensor coil is clamped between said outer and inner rings of said supporting member.

5. A rotational speed signal sensor as defined in claim 2 further characterized in that
said sensor coil is attached to the inner peripheral surface of a ring-shaped supporting member.

6. A rotational speed signal sensor as defined in claim 1 further characterized in that
said rotating magnet is made of isotropic magnetic materials.

7. A rotational speed signal sensor characterized by comprising
(a) a cylindrical rotating magnet whose one cylindrical surface has a first series of a number of n magnetic poles spaced apart equiangularly from each other in the circumferential direction and whose the other cylindrical peripheral surface has a second series of a number of m magnetic poles, where m>n, which are equiangularly spaced apart from each other in the circumferential direction,
(b) a stator having windings which are disposed in opposed relationship with said first magnetic pole series of said rotating magnet so as to deliver the rotating force to it,
(c) a sensor coil having sensor windings which are located at angular positions corresponding to the pitch of said second magnetic pole series of said rotating magnet and are electrically interconnected in a zig-zag form,
(d) a magnetic member which is disposed close to said sensor coil so as to surround said sensor coil from the exterior, and a supporting member for supporting said sensor ring in the form of a ring in such a way that said sensor coil may be in opposed relationship with said second magnetic pole series of said rotating magnet and radially spaced apart therefrom by a predetermined distance.

8. A rotational speed signal sensor as defined in claim 7 further characterized in that
said sensor coil comprises a strip of flexible insulating sheet and a plurality of conductor layers which are formed on said strip as sensing windings in equidistantly spaced apart relationship and are interconnected electrically in a zig-zag form,
said magnetic member comprises a strip of flexible insulating sheet whose one major surface is formed with a magnetic layer, said supporting member consists of an outer ring made of nonmagnetic materials and an inner ring made of nonmagnetic materials, and
said sensor coil and said magnetic member are overlaid one upon another and wrapped around the outer peripheral surface of said inner ring of said supporting member.

9. A rotational speed signal sensor as set forth in claim 7 further characterized in that
said magnetic member consists of a ring made of iron or ferrite and attached to the inner peripheral surface of said supporting member, and
said sensor coil is attached to the inner peripheral surface of said ring-shaped magnetic member.

10. A rotational speed signal sensor as defined in claim 7 further characterized in that
said sensor coil and said magnetic member are formed on a single strip of flexible insulating sheet as a unitary assembly, said supporting member consists of an outer ring made of nonmagnetic materials and an inner ring made of nonmagnetic materials, and
said single strip bearing said sensor coil and said magnetic member is clamped between said outer and inner rings of said supporting member.

11. A rotational speed signal sensor characterized by comprising
(a) an annular rotating magnet whose one cylindrical surface has a first series of a number of n magnet poles which are equiangularly spaced apart from each other in the circumferential direction and whose other cylindrical surface has a second series of a number of m (where m>n) magnetic poles which are equiangularly spaced apart from each other in a circumferential direction,
(b) a stator having windings which are disposed in opposed relationship with said first magnetic pole series of said rotating magnet so as to coact with said first magnetic pole series to deliver the rotating force to said rotating magnet,
(c) a sensor coil having sensor winding elements which are located at angular positions corresponding to the pitch of said second magnetic pole series,
(d) a supporting member for supporting said sensor coil in such a way that said sensor coil may be maintained in the form of a ring which is in opposed relationship with said second magnetic pole series of said rotating magnet and radially spaced apart therefrom by a predetermined distance,
(e) said first magnetic pole series of said rotating magnet coacting with said stator so as to cause the rotation of said rotating magnet and said second magnetic pole series of said rotating magnet coacting with said sensor coil so as to generate a signal corresponding to the rotational speed of said rotating magnet,
(f) said supporting member consisting of an inner ring and an outer ring both of which are made of nonmagnetic materials,
(g) said sensor coil being in the form of a strip and being wrapped around the outer peripheral surface of said inner ring of said supporting member, and
(h) the ends of said strip-shaped sensor coil being extended radially outwardly through slits formed through the wall of said outer ring, maintained in opposed relationship with the side walls of a projection extended out of said outer ring adjacent said slits and soldered to connection pins extended from said outer ring adjacent to said projection thereof.

12. A rotational speed signal sensor as defined in claim 11 further characterized in that said sensor coil consists of a strip of flexible insulating sheet and a conductor layer which is formed on said strip in the form of a coil as a sensing winding.

13. A rotational speed signal sensor characterized by comprising
(a) a hollow cylindrical rotating magnet assembly consisting of a first or inner cylindrical rotating magnet and a second or outer cylindrical rotating magnet which are made of anisotropic magnetic materials and assembled coaxially, the inner peripheral surface of said first or inner rotating magnet having a first series of a number of n circumferentially spaced magnetic poles while the outer peripheral surface of said second or outer rotating magnet having a second series of a number of m (where m>n) circumferentially spaced magnetic poles,
(b) a stator having windings which are disposed in opposed relationship with said first magnetic pole series of said rotating magnet assembly so as to coact said first magnetic pole series to deliver the rotating force to said rotating magnet assembly,
(c) a sensor coil having sensor winding elements which are located at angular positions corresponding to the pitch of said second magnetic pole series of said rotating magnet assembly, and
(d) a supporting member for supporting said sensor coil in such a way that said sensor coil may be maintained in the form of a ring which is in opposed relationship with said second magnetic pole series of said rotating magnet assembly and radially spaced apart therefrom by a predetermined distance, whereby said first magnetic pole series of said rotating magnet assembly may coact with said stator so as to produce the rotating force while said second magnetic pole series of said rotating magnet assembly may coact with said sensor coil so as to derive the rotational speed signal.

* * * * *